United States Patent [19]
Bredal

[11] Patent Number: 5,596,895
[45] Date of Patent: Jan. 28, 1997

[54] METHOD FOR THE EXTRUSION OF METAL OR PLASTIC PROFILES AND APPARATUS FOR WORKING METHOD

[76] Inventor: Torben Bredal, Radyrvaenget 4, DK-3450 Allerod, Denmark

[21] Appl. No.: 318,640

[22] PCT Filed: Apr. 6, 1993

[86] PCT No.: PCT/DK93/00128

§ 371 Date: Nov. 9, 1994

§ 102(e) Date: Nov. 9, 1994

[87] PCT Pub. No.: WO93/19862

PCT Pub. Date: Oct. 14, 1993

[30] Foreign Application Priority Data

Apr. 6, 1992 [DK] Denmark .................. 0464/92

[51] Int. Cl.$^6$ .................................................. B21C 31/00
[52] U.S. Cl. .................................................. 72/16.5; 72/271
[58] Field of Search ................................ 72/271, 13, 16.5, 72/17.2

[56] References Cited

U.S. PATENT DOCUMENTS 2,863,557 12/1958 Munker ........................ 72/271
3,157,281 11/1964 Schnettker et al. ............ 72/271
5,009,091 4/1991 Hinterman et al. ............ 72/17.2
5,237,844 8/1993 Duri .............................. 72/271

FOREIGN PATENT DOCUMENTS 32518 2/1983 Japan ........................... 72/271

Primary Examiner—Lowell A. Larson
Attorney, Agent, or Firm—Thomas R. Vigil

[57] ABSTRACT

The method and apparatus are utilized in the extrusion of profiles of material suitable for extrusion, such as metal or plastic. In the method of the invention, the temperature of the extruding product 10 is measured continuously and without contact immediately outside the extrusion outlet 7, and the data measured are used to adjust the said temperature to the effect that the temperature of the extruding product is maintained as constant as possible from one product to the next, whereby controlling devices 17, 18, 19 20, 21, 22 are provided to adjust the extrusion pressure on the basis of a calculation of the values measured and to check the quality of the profile and the geometric dimension for comparison with the predetermined values. The apparatus comprises an extrusion machine 1 having a measuring device for measuring the temperature at the outside of the outlet 7 continuously and without contact, said device 11 being a camera 11 responsive to infrared radiation, as is the case with a device 16 for measuring the temperature of the workpiece 6.

13 Claims, 4 Drawing Sheets

METHOD FOR THE EXTRUSION OF METAL OR PLASTIC PROFILES AND APPARATUS FOR WORKING METHOD

The present invention relates to a method of extruding profiles of material, such as metal or plastic, comprising the steps of:

a) measuring the temperature of the extruding product continuously;

b) checking the speed of extrusion of the extruding product;

c) reducing the speed of extrusion if the temperature of the extruding product rises above a predetermined optimum temperature, and reversely, increasing the speed of extrusion if the temperature falls below the predetermined optimum temperature, all in such a manner that the temperature of the extruding product is maintained as constant as possible.

The present invention also relates to an apparatus for the working method according to the invention.

In the extrusion of metal or plastic profiles some mal formations or irregularities in the structure of the extruded product occur during the extrusion operation, in particular in profiles having varying temperatures in the different areas of the profile, and such malformations and irregularities of the material structure will result in an unsatisfactory quality of the end product.

Generally, such malformations and irregularities are the result of varying temperatures of the extruding product during the extrusion operation, due to the the forces which effect the material in order that it may be pressed through the extrusion outlet.

To counter these malformations and irregularities attempts: have been made to optimize the extrusion process in various ways.

GB Patent Specification no. 1.431.884 describes a method of substantially the kind described in the introduction.

In this known method, the temperature is measured by direct contact at the foremost portion of the extruding product near the outlet in order to form an estimate of the temperature. At the same time the thermal radiation of the extruding product is measured without contact by means of an instrument responsive to heat, and a thermal radiation temperature is determined, which is then corrected on the basis of the estimate of the extrusion temperature. During the extrusion operation determination of a corrected thermal radiation continues without contact, whereupon the speed of extrusion is reduced, if the thermal radiation temperature rises above a predetermined optimum temperature, and the speed of extrusion is reversely in creased if the thermal radiation temperature falls below the predetermined optimum temperature.

The above method, however, has some drawbacks. Thus, measuring the temperature of the extruding product by direct contact in order to obtain a correction of the thermal radiation temperature is a difficult procedure, and in addition, the method is complex and time-consuming so that a production capacity, which can be considered optimum as compared to the performance of modern extrusion apparatuses cannot be obtained.

The said patent specification also provides an apparatus for use in the extrusion of profiles, and this known apparatus is of the type which comprises a machine having an extrusion outlet and means for pressing material suitable for extrusion, such as metal or plastic, through the outlet.

It is therefore an object of the present invention to provide a method, whereby the malformations and irregularities of the material structure referred to above can be reduced considerably and possibly avoided altogether, and at the same time an optimization of the process must be obtained in view of a rational production of profiles.

This object is achieved by means of a method of the kind described in the introduction, said method according to the invention comprising the features of:

d) measuring the thermal radiation from the extruding product without contact;

e) adjusting the extrusion pressure and thus the rate of extrusion and the thermal radiation on the basis of a calculation of the values measured;

f) checking the quality of the profile and the geometric dimension of the extruding product and comparing to the predetermined values;

g) repeating the steps of e) and f) until a divergence is reached between on one hand the quality of the profile checked as well as the geometric dimension, and on the other hand the predetermined values;

h) in the event of divergence, returning to the extrusion pressure used previously and controlling said pressure in such a manner that the temperature of the extruding product is maintained as constant as possible; and i) storing the extrusion pressure used hereafter in a memory together with the remaining data relating to the extrusion pressure.

An extrusion of profiles having a constant or at least fairly constant temperature over the entire profile is hereby accomplished, which will result in a uniform standard of quality comprising the entire length of the profile. It is thus possible to carry out an extrusion called isothermal extrusion, whereby an extrusion process, such as extrusion, control and correction as required can be optimized and the operation accomplished in much less time than known until now, with increased productivity and thus a lower priced product as a result.

As described above, the invention also relates to a apparatus for use in the implementation of the method in question, which apparatus is characterized in that the machine comprises a device which is adapted to measure continuously and without contact the temperature of the extruding product immediately outside the outlet, that the apparatus has means to adjust the extrusion pressure on the basis of a calculation of the values measured, that the apparatus has means to check the quality of the profile and the geometric dimension of the extruding product for comparison with predetermined values, that the apparatus has storage means for storing measured temperatures and extrusion pressures, and that controlling devices are provided to control the extrusion pressure in such a manner that the temperature of the extruding product is kept as constant as possible from one product to the next.

The method and the apparatus of the invention will be explained in detail below with reference to the drawing wherein FIG. 1 illustrates an extrusion machine in an apparatus according to the invention seen from above and substantially schematic;

Figure 1:
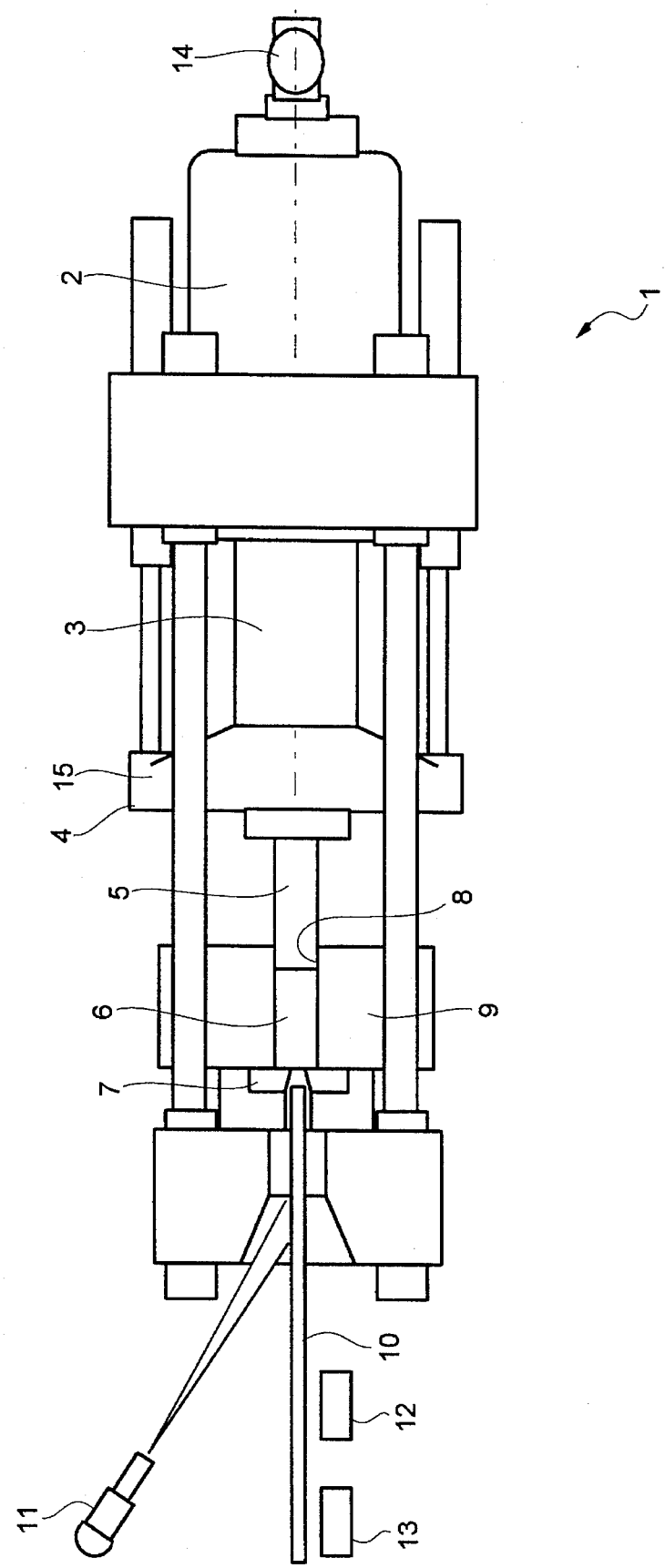

The drawing having the reference numeral 1 illustrates a known extrusion machine having a hydraulic cylinder 2 with a piston and a piston rod 3, whereby a clamp 4 can effect a workpiece 6 by means of a punch 5. The workpiece consists of material of suitable plasticity applicable for extrusion, such as aluminium or similar metal or plastic. For the extrusion through an extrusion outlet 7, the workpiece 6 is placed in a so-called container in the form of a bore 8 in a matrix 9, said bore 8 having dimensions corresponding to the workpiece 6 and the punch 5, to the effect that the workpiece 6 or portions thereof are prevented from escape out of the bore 8 past the punch 5 as a power is exerted on the workpiece 6 by means of the machine 1 in a direction towards the outlet 7. Due to the the power exerted the workpiece 6 is deformed and pressed through the outlet 7, and the result is a profile 10, the contour and section of which is determined by the shape of the opening of the outlet 7.

Figure 2:
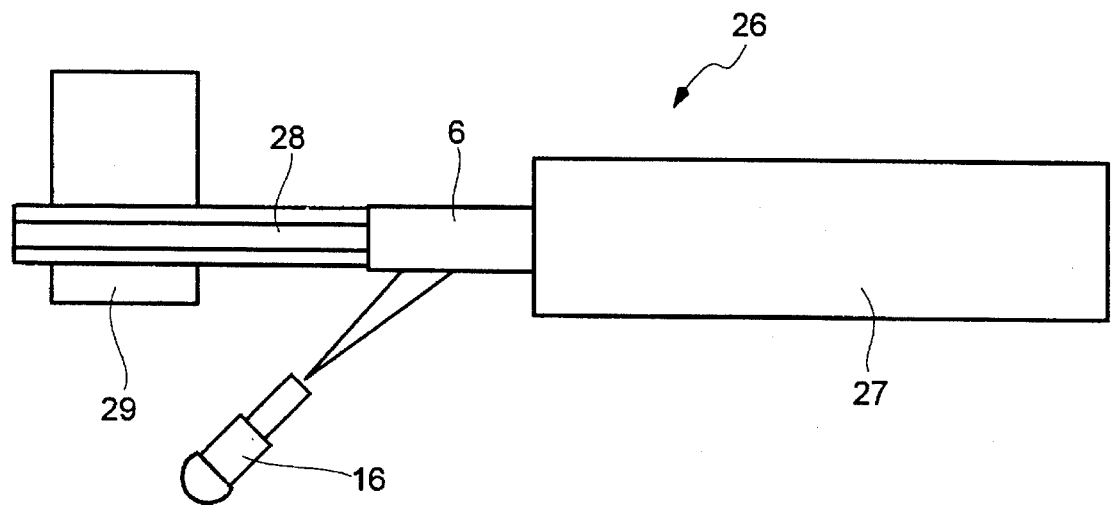
FIG. 2 illustrates schematically and seen from above a unit of the apparatus of the invention, for heating a workpiece prior to its transfer to the machine in FIG. 1.

FIG. 2 shows schematically seen from above a unit 26, which is used to heat or to form the workpiece 6, a so-called billet, prior to its extrusion in the machine 1. The unit 26 comprises a furnace 27, from which the heated or formed workpiece 6 is pressed out gradually during its formation along a guide 28. A transportation unit 29 is provided to carry the workpiece 6 sideways along the machine 1, where it is introduced into the bore 8.

Figure 5:
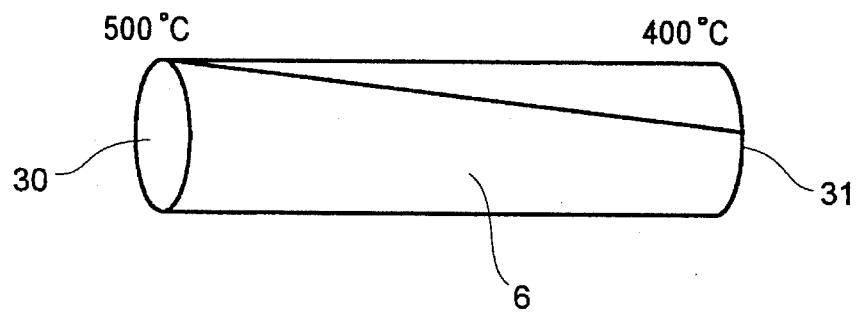
FIG. 5 illustrates schematically variations of temperature in a material prior to its extrusion.
Figure 3:
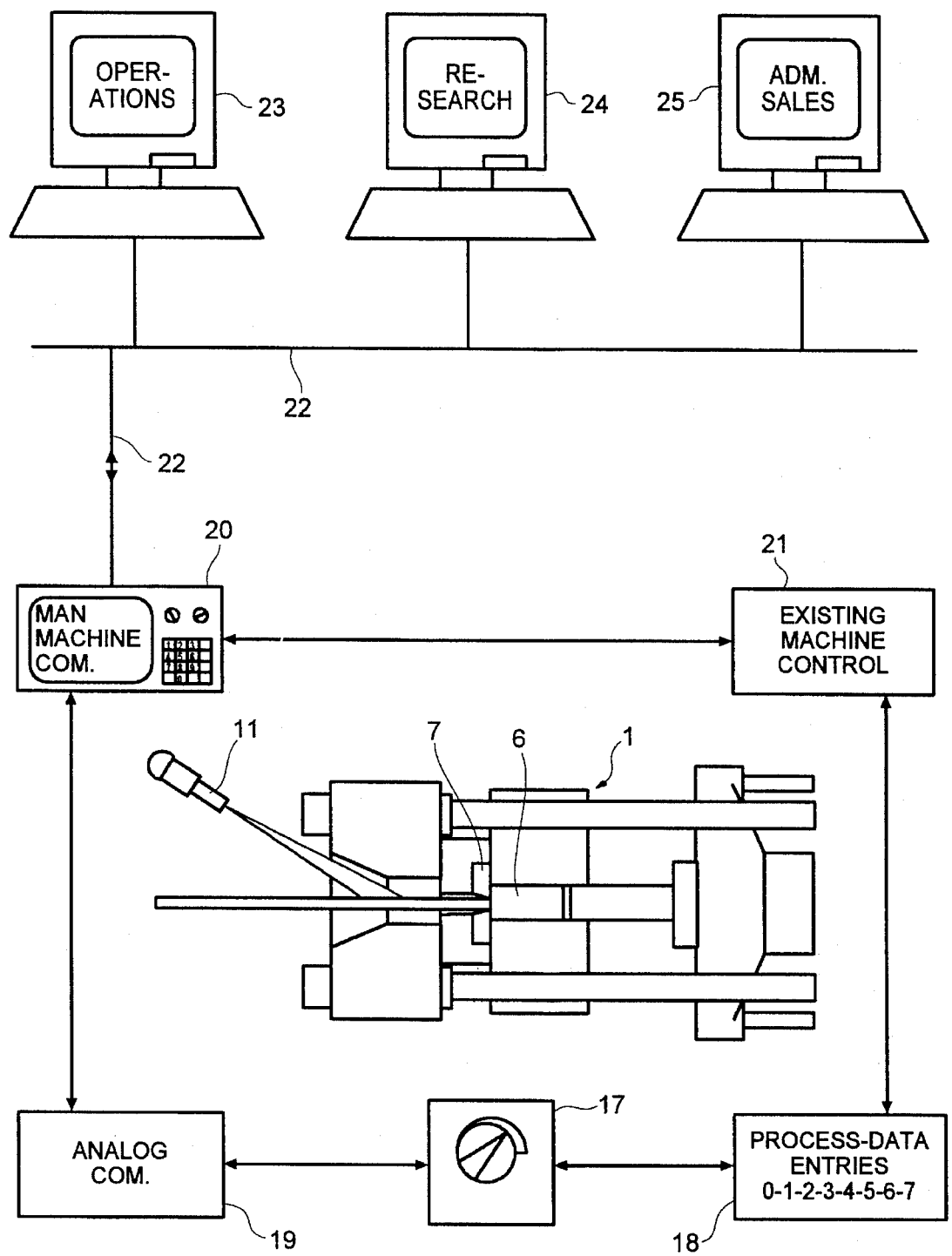
FIG. 3 illustrates schematically a control unit for the control of the apparatus of the invention.

The temperature of the individual workpiece differs between its foremost portion 30 and its rear portion 31 as illustrated in FIG. 5.

In the known methods of extrusion of materials through the outlet 7 the process is controlled in such manner that a constant rate of speed is obtained for the extruding product. For the achievement of this constant rate of extrusion, the pressure in the hydraulic cylinder 2 must be decreased gradually, since the resistance of the workpiece 6 against deformation will decrease concurrently with the material decreasing in size, whereby the accumulated inner friction of the workpiece decreases, and the backpressure of the outlet 7 drops. During the extrusion the temperature of the workpiece 6 will increase as well, in particular in the outlet 7 and in the finished profile 10.

In addition hereto, the temperature increase will cause a modification of the plasticity of the material to the effect that the speed of extrusion through the outlet 7 would be modified unintentionally during the extrusion if the extrusion pressure at this point were not lowered in the known method.

In this context, it is known art to store the data applied during the extrusion to the purpose that a similar product can be obtained during extrusion of the subsequent item or any future productions.

An extrusion process involves four important parameters, which are interdependent: the temperature of the workpiece, the maximum extrusion pressure, the speed of extrusion of the product, and the temperature of the extruding product or profile.

The temperature of the workpiece depends on the maximum extrusion pressure and on the temperature of the profile. A lower temperature of the workpiece requires a higher extrusion pressure and results in a lower temperature of the profile.

The maximum extrusion pressure depends on the temperature and on the length of the workpiece. Less extrusion pressure requires higher temperature in the workpiece or shorter lengths hereof.

The speed of extrusion depends on the temperature of the profile and the temperature of the material. Higher speeds of extrusion result in higher temperatures of the profile, whereby 1 m/min. corresponds to 1° C.

The temperature of the profile depends on the temperature of the material and on the speed of extrusion. A high temperature of the profile is the result of a high temperature of the material and may be lowered at lower speeds of extrusion.

Figure 4:
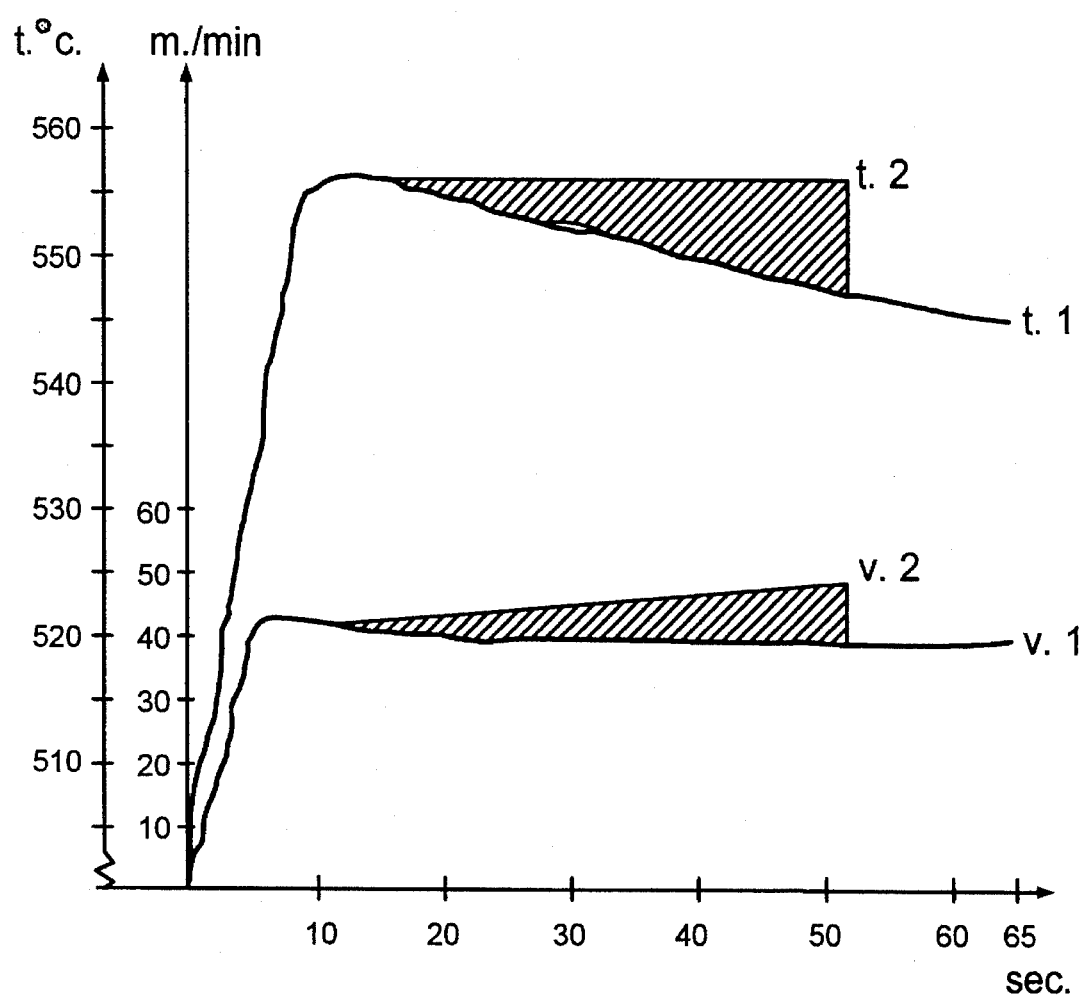
FIG. 4 is a diagram illustrating coherent values relating to temperature and rate of extrusion in a material being extruded in a known method and in the method of the invention.

FIG. 4 shows a diagram indicating coherent values of temperatures and pressures in a traditional extrusion.

The axis of abscissae is divided into seconds, and the two axes of ordinates indicate the temperature in °C. representing m/min, whereby the full drawn curve t.1 refers to the temperature divided axis of ordinates, and the full, drawn curve v.1 refers to the speed divided axis of ordinates.

In this known extrusion process an extrusion pressure exerted, which in the course of app. five seconds will cause the rate of speed of the extruding product 10 to reach app. 40 m/min, and this rate of speed is kept fairly constant as indicated in the curve v.1, during the remaining extrusion process by means of a decreasing extrusion pressure.

If the workpiece has been preheated prior to its extrusion as shown in FIG. 5, wherein the front portion 30 has a temperature of app. 500° C., and the temperature of the rear portion is app. 400° C., i.e. a so-called "taper heating" of app. 100° C., the temperature sequence during the extrusion will be as shown by the curve t.1. The temperature of the extruding product outside the outlet 7 therefore will rise from app. 500° C. to 555° C. in just under 10 sec., whereupon the temperature will drop fairly constant.

The declining temperature of the extruding product 10 will result in a heterogeneous material structure and thus a lower quality of the finished product, notably in profiles having varying distributions of material in their individual areas.

According to the method of the invention the extrusion pressure is controlled on the basis of the values measured in order to maintain a constant temperature of the: extruding product 10 immediately outside the outlet 7, to ensure optimum quality in the finished product, whereas a constant speed of extrusion is observed, to the extent possible, in the known method.

For use in the implementation of the method of the invention an apparatus is provided, comprising a per se known extrusion machine 1 and a likewise known unit 26 for heating and formation of a workpiece 6 which is to be extruded in the machine 1, said apparatus according to the invention comprising a control unit with different components as indicated below.

To this purpose the machine 1 is provided with a number of measuring or recording devices, such as:

A device 11, for example a camera, which will respond to infrared radiation for infrared exposure, is directed towards the point of the profile 10 which is located. immediately outside the outlet 7, to the effect that the device 11 can detect the infrared radiation at this point and convert the thermal radiation into data about the temperature.

Measuring or recording devices 12 and 13 for recording the length of the profile in progress, respectively the speed of extrusion are provided as well.

At the hydraulic cylinder 2 is provided a pressure measuring device 14 for continuous registration of the extrusion pressure prevailing at any given time, and the clamp 4 is connected to a measuring device 15 for measurement of the position of the clamp and thus the punch, whereby the length or more correctly the length of the workpiece remaining at any given time can be deduced.

The unit 26 may be provided with a measuring device 16 for measurement of the temperature of the workpiece 6, said measuring device 16 being preferably of the same type as the measuring device 11 used at the outlet 7. This measuring device 16 may be applied advantageously, however, it is not absolutely necessary in order to carry out the method.

Finally, a manual adjusting device 17 is provided by means of which it is possible to control or intervene in the progress of the extrusion.

The measurements carried out during the extrusion of the profile 10 by means of the mentioned measuring or recording devices 11, 12, 13, 14, 15 and 16 as well as by means of the manual interventions of the adjusting device 17, are transmitted to process data entries 0-1-2-3-4-5-6-7 in a control unit comprising an entry panel 18, an analog converter 19 for analog communication, a command panel 20 for man/machine communication, and an existing, per se known machine control 21.

The control unit can also via circuits 22 (constituting a so-called databus for data transmission) deliver and receive information or orders from an administrative unit comprising computers 23, 24 and 25 covering operations, research, respectively administration/sales.

In operation of the apparatus, the workpiece 6 is placed in position in the bore 8 of the machine, and the punch 5 is brought to bear against the workpiece by activation of the hydraulic cylinder 2. Any such data which might have been stored during earlier productions of the same profile are obtained up from the command panel 20 by means of the manual adjusting device 17, and any additional commands as may be required for the present task are added.

In the method of the invention the sequence of the extrusion is controlled as indicated in the curves v.2 and t.2.

The sequence is reached by a modification of the extrusion pressure in such a manner that the speed of extrusion of the product 10 from the outlet 7, as the speed has reached the commonly known speed of app. 40 m/min, will continue increasing gradually at a moderate rate as shown in the curve v.2, whereby the temperature will remain constant during the remaining part of the extrusion, as shown in the curve t.2.

At the start of the extrusion of a new profile 10 the first three to five workpieces 6 should be extruded at a normal constant speed, established by experience, until the process becomes constant. When applying a new outlet 7 the temperature of the material is usually set higher for the purpose of heating the outlet 7 for the ideal temperature of production.

During the extrusion of the first three to five workpieces 6, the highest temperature of the profile reached by the extruding product 10 must be observed and it should be checked whether the geometric dimension of the profile can be approved. If so, such temperature of the profile can be entered as MAX TEMP.

At the same time the values of MAX SPEED and MIN SPEED are entered at 2–3 m/min. higher than the current speed of extrusion.

The MIN TEMP. and MIN SPEED entered initially indicate the value of the profile after the emergence of app. 1 meter, whereby it is achieved that the adjustment begins as these values have been reached by means of the automatic adjustment.

The commands from the manual adjustment 17 are transmitted to and from the process data entries 0-1-2-3-4-5-6-7 as well as to and from the command panel 20 and the existing machine control 21 via the analog converter 19.

During the extrusion of the profile 10 the measuring or recording devices 11, 12, 13, 14, 15 and 16 currently supply data for the control in order to maintain the temperature of the profile 10 as constant as possible immediately at its emergence from the outlet 7, and meanwhile some corrections of the process may still be made by means of the manual adjustment 17 or automatically by means of the analog converter 19.

By means of the method and the apparatus of the invention the extrusion temperature is increased towards higher degrees in small steps within the permitted temperature entered by the operator.

After each increase of temperature the quality of the profile is checked:

a) either manually by the operator with subsequent approval of the next increase in temperature, or b) automatically by scanning the surface, the geometric dimension and the dimensional stability of the profile by means of a camera, and the image scanned is then signal processed and compared to a reference image in a pattern recognition system. If compatible, the next step in the increase of temperature is approved, and if incompatible, an alarm is given and the operator will interfere.

The optimum combination of temperature and speed of extrusion once achieved for a given profile is stored in the apparatus for later use.

The result is that more material is extruded through the outlet 7 per unit of time in the method of the invention as compared to the known method, and at the same time the end product has a more homogeneous material structure in the respective sections of the profile as compared to what could be obtained by means of the known technique.

In the method of the invention the temperature of the extruding profile 10 is measured without contact, directly and additionally without any form of correction in contrast to the method known from in GB Patent Specification No. 1.431.884. The method of the invention is thus based alone on measurement without contact of the extrusion temperature of the profile and compensates automatically for any normal fluctuations of temperature of the workpiece 6 which might occur. Thus, there is normally no need to measure the temperature of the workpiece 6.

The method of the invention provides automatic optimization of the extrusion temperature and goes beyond strict adherence to the set "optimum" temperature.

Finally, the method of the invention provides self-regulation of adjustment in spite of considerable variations of type and complexity of profiles, tool or outlet as well as pressure characteristics.

I claim:

1. A method for the manufacturing of lengths of profiles by extrusion, said method comprising:

(a) selecting a workpiece of metal or plastics;

(b) preheating said workpiece;

(c) introducing said workpiece into a bore of an extrusion machine, said bore communicating with an extrusion die orifice;

(d) driving a punch in a stroke longitudinally into said bore in a direction towards said orifice so as to apply onto said workpiece a pressure sufficient to deform said workpiece and drive it gradually through said extrusion die orifice at a speed of extrusion which increases gradually from the onset of each stroke until it has reached a predetermined minimum value, whereby said workpiece is gradually formed into an extrudate eventually building a length of extruded profile;

(e) continually measuring the temperature of said extrudate by detecting the thermal radiation from said extrudate at a point close to its emergence from said die orifice;

(f) measuring the speed of extrusion of said extrudate;

(g) once said speed of extrusion has reached said predetermined minimum value, adjusting said speed of extrusion by adjusting the extrusion pressure driving said punch with the purpose of maintaining the temperature of said extrudate as close to a predetermined temperature set-point value as possible, in that said extrusion pressure is reduced if said temperature rises above said temperature set-point value and said extrusion pressure is increased if said temperature drops below said temperature set-point value;

(h) checking the quality and the geometric dimensions of said extruded length of profile and comparing to predetermined values to determine whether said extruded length of profile is acceptable or not;

(i) if yes, then stepping up said temperature set-point value in a small increment, retracting the punch, and repeating from step (a);

(j) if no, then stepping down said temperature set-point value to the value previously used and storing this value in a memory together with other data relating to the extrusion operation.

2. The method according to claim 1 wherein the adjustment of the speed of extrusion according to step (g) is governed to stay within predetermined upper and lower limits.

3. The method according to claim 1 wherein said predetermined minimum value of aid speed is initially set to 40 meters per minute.

4. The method according to claim 3 wherein the driving of the punch according to step (d) is controlled from the onset of each stroke to ramp up the speed of extrusion, to reach said predetermined value within approximately five seconds.

5. The method according to claim 4 wherein lower limits for speed and temperature are established by operating the extrusion machine at a selected constant speed of extrusion until its temperature has stabilized, checking whether the lengths of profile extruded by the selected constant-speed extrusion process can be approved, detecting the values of speed and temperature of the extrudate at a position just outside the die orifice at an instant where approximately 1 meter of a profile has emerged from the die outlet, and storing these values as new values of said lower limits for speed and temperature.

6. An apparatus for the manufacturing of lengths of profile by the extrusion of workpieces of metal or plastics, said apparatus comprising:

a bore;

an extrusion die orifice communicating with said bore;

a punch received in said bore and adapted for reciprocating movement along said bore;

means for driving said punch along said bore in the direction towards said die orifice with a force sufficient to deform a workpiece inserted in said bore and force it to be extruded through said die orifice to form an extrudate eventually building an extruded length of profile;

a device for continuous, non-contacting measurement of the temperature of the extrudate at a point immediately outside the die orifice;

means for measuring the speed of extrusion;

means for measuring the pressure applied in driving said punch;

means for controlling the pressure applied in driving said punch adapted for increasing the pressure from the onset of each stroke until the speed of extrusion has reached a predetermined minimum value, and for then keeping the temperature of the extruded profile as close as possible to a preselected temperature set-point value;

means for checking the quality and the geometric dimensions of said extruded length of profile and for comparing the result of this check to predetermined values; and storage means for storing measured values of temperatures and extrusion pressures.

7. The apparatus according to claim 6 wherein said device for measurement of the temperature of the extrudate comprises a device sensitive to infrared radiation, such as an infrared sensitive camera.

8. The apparatus according to claim 7 further comprising means for incrementing and decrementing said temperature set-point value.

9. The apparatus according to claim 8 further comprising a unit for preconditioning workpieces, said unit comprising a furnace, a guide, a transportation unit, and a device adapted for measuring the temperature of the workpiece immediately prior to its transfer to the bore.

10. The apparatus according to claim 9 wherein the device for measuring the temperature of the workpiece comprises a device sensitive to infrared radiation, such as an infrared sensitive camera.

11. A method for the manufacturing of lengths of profiles by extrusion, said method comprising (a) selecting a workpiece of metal or plastic;

(b) preheating said workpiece;

(c) introducing said workpiece into a bore of an extrusion machine, said bore communicating with an extrusion die orifice;

(d) driving a punch in a stroke longitudinally into said bore in a direction towards said orifice so as to apply onto said workpiece a pressure sufficient to deform said workpiece and drive it gradually through said extrusion die orifice at a speed of extrusion which increases gradually from the onset of each stroke until it has reached a predetermined minimum value, whereby said workpiece is gradually formed into an extrudate eventually building a length of extruded profile;

(e) continually measuring the temperature of said extrudate by detecting the thermal radiation from said extrudate at a point close to its emergence from said die orifice;

(f) measuring the speed of extrusion of said extrudate; and (g) once said speed of extrusion has reached said predetermined minimum value, adjusting said speed of extrusion by adjusting the extrusion pressure driving said punch with the purpose of maintaining the temperature of said extrudate as close to a predetermined temperature set-point value as possible, in that said extrusion pressure is reduced if said temperature rises above said temperature set-point value and said extrusion pressure is increased if said temperature drops below said temperature set-point value.

12. The method according to claim 11 wherein the adjustment of the speed of extrusion according to step (g) is governed to stay within predetermined upper and lower limits.

13. The method according to claim 12 wherein the driving of the punch according to step (d) is controlled from the beginning of each stroke to ramp up the speed of extrusion, until the adjustment of the speed according to step (g) is engaged.

\* \* \* \* \*